United States Patent [19]

Brandriff

[11] 4,142,631
[45] Mar. 6, 1979

[54] STERILE THERMOMETER SHEATH

[76] Inventor: Robert C. Brandriff, Box 82, R.D. 2, Pomfret Center, Conn. 06259

[21] Appl. No.: 794,820

[22] Filed: May 9, 1977

[51] Int. Cl.² .............................................. B65D 85/38
[52] U.S. Cl. ................................. 206/306; 206/484.2; 206/634
[58] Field of Search ............ 206/212, 306, 484, 484.2, 206/634, 628, 619

[56] References Cited

U.S. PATENT DOCUMENTS

| 3,215,265 | 11/1965 | Welin-Berger | 206/212 |
| 3,301,394 | 1/1967 | Baermann et al. | 206/306 |
| 3,469,685 | 9/1969 | Baermann | 206/306 |
| 3,552,558 | 1/1971 | Poncy | 206/306 |
| 3,809,230 | 5/1974 | Poncy | 206/306 |
| 4,002,276 | 1/1977 | Poncy et al. | 206/278 |

FOREIGN PATENT DOCUMENTS 748730  12/1966  Canada ...................................... 206/306

Primary Examiner—William Price
Assistant Examiner—Bruce H. Bernstein
Attorney, Agent, or Firm—Malin and Haley

[57] ABSTRACT

A new and useful improvement in sterile thermometer sheaths. The improved sheath may be constructed by providing a weakened area in the laminated cover of the sheath immediately adjacent the closed end of the sheath. In use the cover is slid backwards in an accordian-like fashion along the length of said sheath thereby exposing said sheath through the weakened cover area for use in taking a patient's temperature and the contaminated sheath may be recovered before disposal.

5 Claims, 13 Drawing Figures

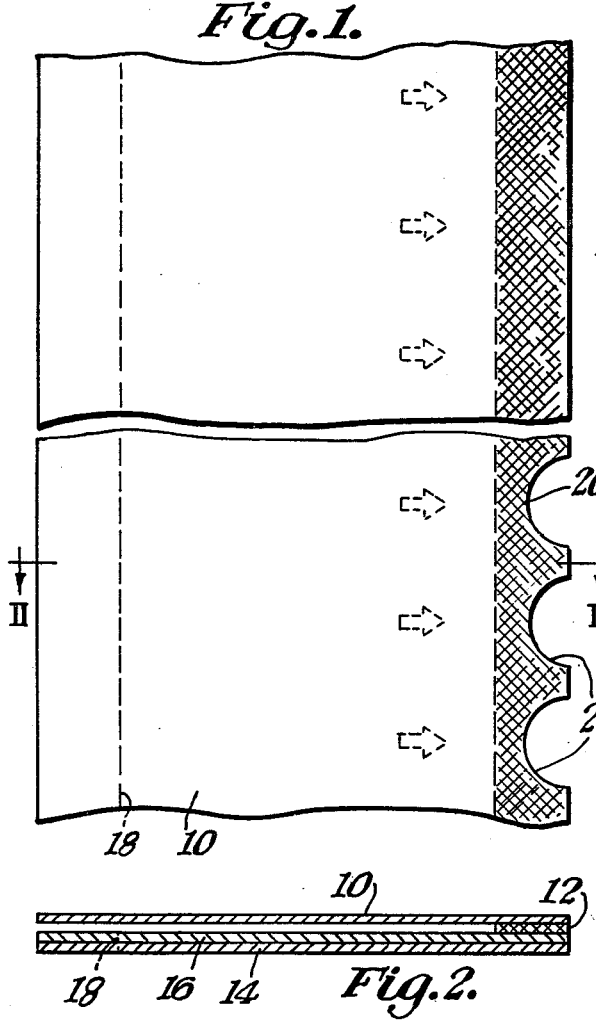
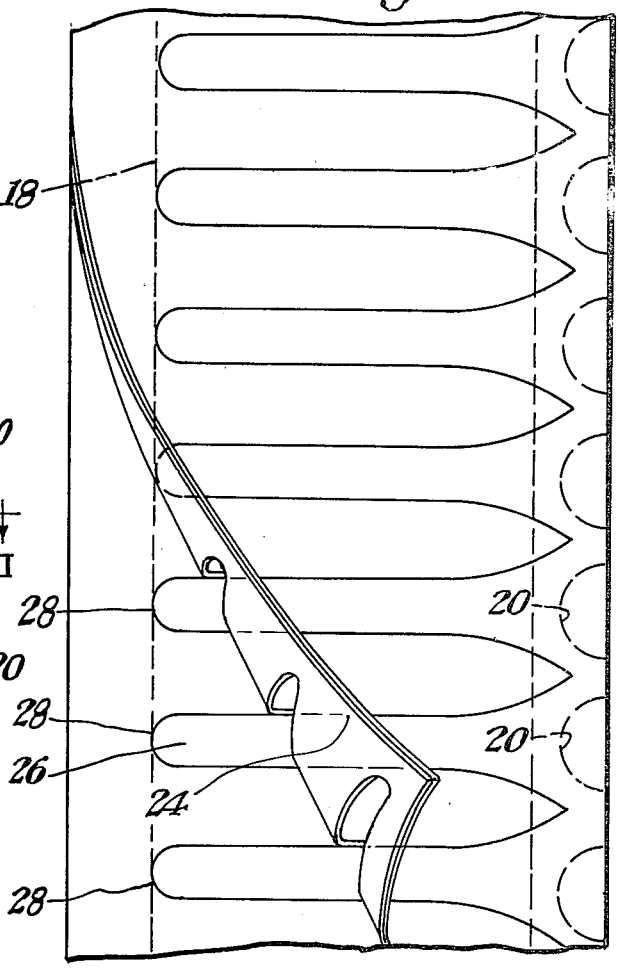
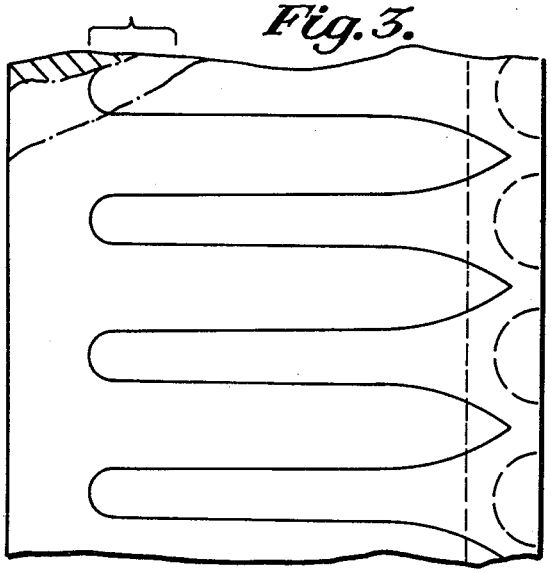
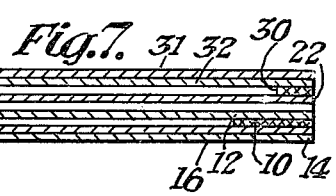
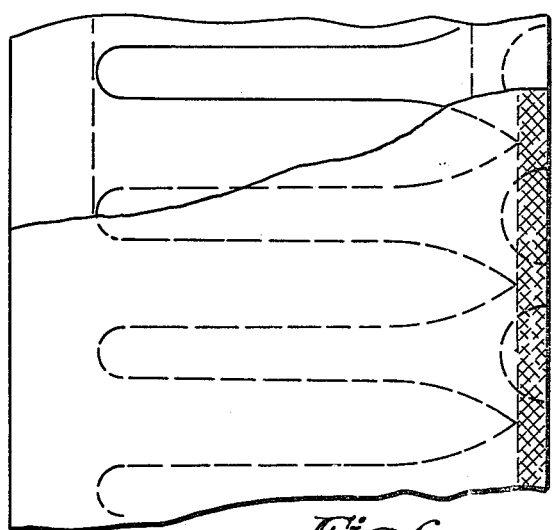

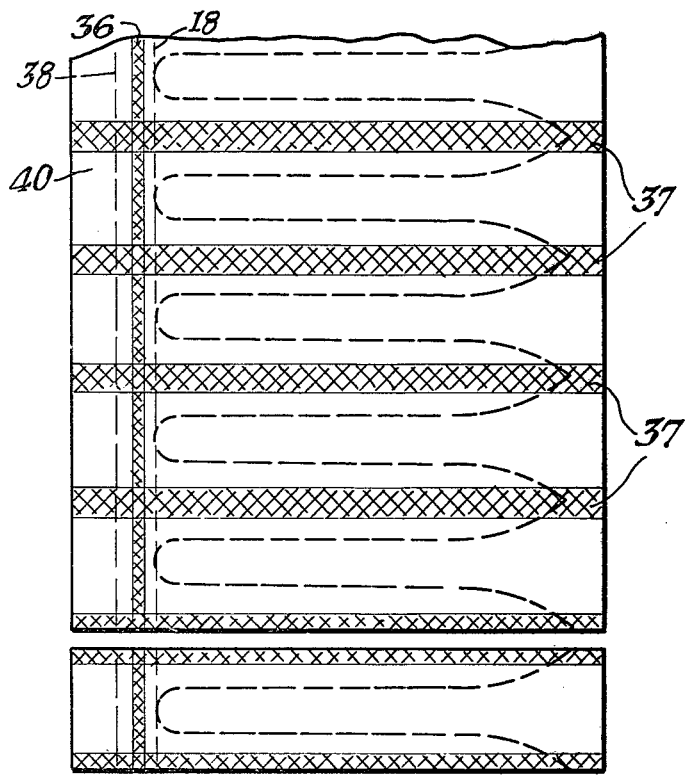
Fig. 8.
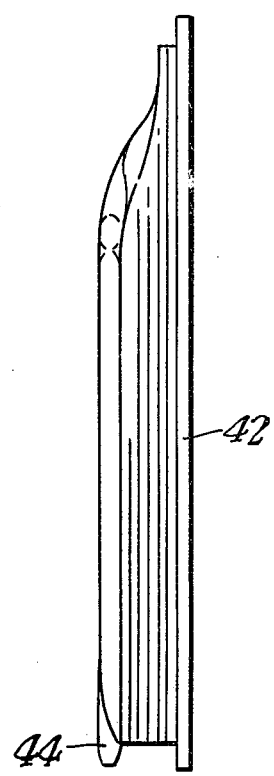
Fig. 9.
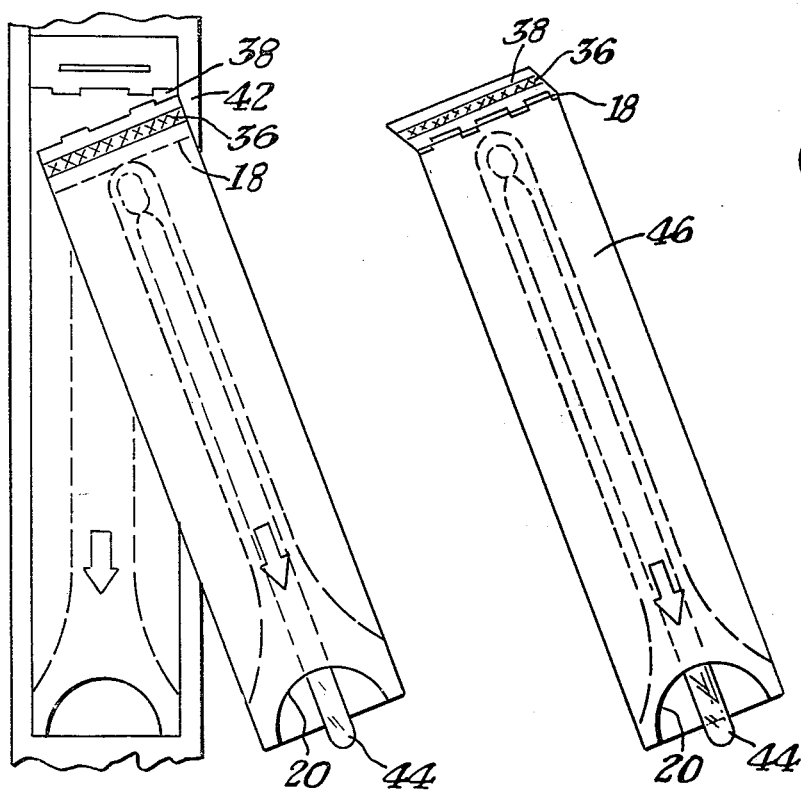
Fig. 10A.
Fig. 10B.
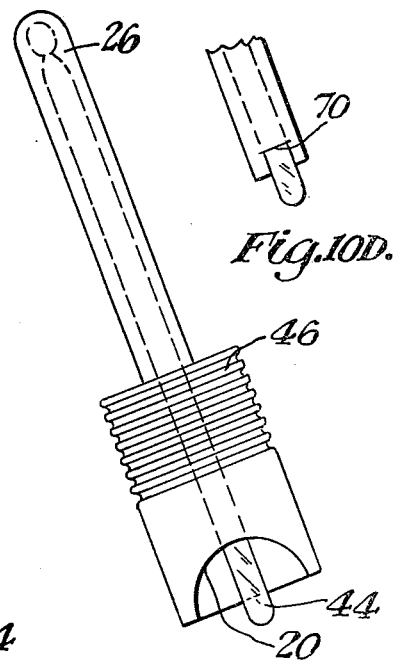
Fig. 10D.
Fig. 10C.

4,142,631

STERILE THERMOMETER SHEATH

BACKGROUND OF THE INVENTION

The use of pre-sterilized, disposable thermometer sheaths has become common practice within the medical profession, particularly for in-hospital application. Such sheaths are encased in a removable cover which preserves the sterile condition of the sheath until time of use, and typically require complete removal and discarding of one or more cover sheets before the operable portion of the thermometer is adequately exposed for use. After use, the soiled sheath is removed from the thermometer and discarded, while the uncontaminated thermometer may be re-used with another sheath in this manner as often as needed. The use of sheaths has replaced the need for central or individual patient disinfectant containers, and thereby eliminated the chance of spillage, contamination from unchanged liquid, and similar problems consistent with the disinfectant method of thermometer cleaning.

In my co-pending application, Ser. No. 695,097 filed June 11, 1976, I described a method of fabricating such thermometer sheaths which allows the retention upon the sheath while in use of a tab adjacent the non-operable end of the thermometer thereby eliminating the necessity for the physician or nurse to touch the soiled portion of the sheath in order to remove the sheath from the thermometer following use. Despite the convenience of this type of thermometer sheath construction, it has nevertheless been found that accidental contact with the soiled surface of the sheath is commonplace. It would thus be desirable to develop a sheath and associated cover which will allow an attending physician or nurse greater protection from such accidental contact.

BRIEF DESCRIPTION OF THE INVENTION

This invention relates to a new and useful improvement in sterile thermometer sheaths. The improved sheath may be constructed by providing a weakended area in the laminated cover of the sheath immediately adjacent the closed end of the sheath. In use the cover is slid backwards in an accordian-like fashion along the length of said sheath thereby exposing said sheath through the weakened cover area for use in taking a patient's temperature and the contaminated sheath may be recovered before disposal.

I have discovered an improved sheath assembly that provides all the advantages or prior sheath packages, but also contains significant improvements over prior systems. One specific feature of this design is the continued attachment of the cover to the sheath during use when the sheath has been exposed. Such construction eliminates the nuisance factor of having to dispose of the removed covers at the start of the temperature taking procedure, and also allows the cover to be conveniently repositioned over the soiled sheath after the procedure is complete, thereby reducing the chance of accidental contact with the soiled surface of the sheath. This improved sheath assembly comprises the conventional top and bottom cover sheaths surrounding a sterilizable plastic thermometer sheath as is well known to those skilled in the art. My novel construction, however, employs a cover with a weakened area immediately adjacent the closed end of the sterile thermometer sheath, thereby allowing that portion of the cover to be slid in accordian like fashion along the length of the sterilizable sheath thereby exposing the sheath and the thermometer contained therein for use with a patient. During the temperature taking process, the cover is held immediately adjacent the non-operable end of the thermometer. Once the process of taking the temperature is completed, the cover may be repositioned about the sheath in order that the physician or nurse may grip the sheathed thermometer about its operable or bulb end without fear of accidental contact with the soiled sheath itself.

It is an object of the invention to provide a sheath and cover inseparated during use.

Another object of the invention is to provide a unitized sheath and cover that may recover a contaminated sheath.

In accordance with these and other objects which will be apparent hereinafter, the instant invention will now be described with particular reference to the accompanying drawings.

BRIEF DESCRIPTION OF THE DRAWINGS

FIG. 1 is a top view of the coated bottom cover and the first layer of plastic film following laimination and cutting and removal of the sheath entry notch.

FIG. 2 is a side view of the cover shown in FIG. 1.

FIG. 3 is a top view of the assembly shown in FIGS. 1 and 2 with the addition of a second plastic film layer sealed to the first film layer along the sheath profile lines to form the plastic sheaths.

FIG. 4 is a side view of the assembly shown in FIG. 3.

FIG. 5 is a top view of the composite sealed areas shown in FIGS. 3 and 4 with the scrap plastic area being removed from around the formed plastic sheaths.

FIG. 6 is a top view of the stripped sheaths of FIG. 5 with the back cover laminated to the second plastic film layer.

FIG. 7 is a side view of the assembly shown in FIG. 6.

FIG. 8 shows the cover seal-patterns and the (optional) package-tab perforations for the composite web assembly of FIGS. 6 and 7, and the severing of individual sheath assemblies from the continuous web.

FIG. 9 demonstrates a means of attaching the severed sheath assembly of FIG. 8 into a convenient dispensor package, using the packaging-tab as the attaching means.

FIGS. 10A, 10B and 10C demonstrate the method of exposing the operable portion of the sheath assembly with a clinical thermometer inserted into the sheath.

FIG. 10D shows a slotted opening to the sheath.

DESCRIPTION OF THE PREFERRED EMBODIMENT

A complete understanding of my invention will be gained by those skilled in the art from the following description with reference to the drawings.

Referring to FIGS. 1 and 2, the first plastic web 10 is bonded or laminated at 12 to the coated side 16 of the bottom paper cover 14. The cover can be weakened or scored along line 18 for use as set forth below. After lamination, the composite plastic/paper web is notched at 20 by a suitable die at locations that will later correspond to individual product center lines. These notches are therefore in register with a suitable printed product pattern on the paper as indicated by the arrow (in broken lines).

Referring to FIGS. 3 and 4, the laminated and notched web shown in FIGS. 1 and 2 is contacted by a second plastic web 22 as shown and a heated die impressed against the surface of the plastic web to seal the lower plastic web 10 to the new upper plastic web 22 along the die profile. The coating of the paper is selected to have a higher melting point than the plastic films in order that control over the coating/film adhesion can be maintained by regulation of die temperature. The effect of the heated die serves to form the sheath by bonding the plastic films together along the die profile, and in addition, substantially weakens the films in an area adjacent the sheath to allow the scrap plastic to be stripped away during a later operation. With a suitable selection of die temperatures as noted above, the sheaths remain lightly bonded to the paper coating, and thereby retain their position on the paper coating during the subsequent operation. FIG. 5 shows the removal of the scrap plastic areas, 24 from around the formed plastic sheath, 26. Application of sufficient die heat and pressure along lines 28 has resulted in the formation of the sheaths, and also substantially weakened the plastic film 22 and 10 around the sheaths to allow stripping of the scrap 24 from the sheath. In addition, the heat and pressure applied by the die has formed a light bond between the sheath and the lower cover paper which is necessary in order that the sheath remaining following the removal of the scrap 24 is maintained in its position for additional processing.

FIGS. 6 and 7 show the sheath paper assembly with scrap removed as shown in FIG. 5 which has been subsequently laminated or bonded 30 to the coated side 32 of the upper paper cover 34. As may be seen in the Figure, the bonded area 30 does not extend beyond the inner edge of the notches 20 and thereby maintains an open channel adjacent notches 20 into the interior of the sheath 26. Bonded area 30 also serves to seal the gap between the second plastic film web and the top cover, and thereby blocks contamination of the sheath by migration of contaminants through this gap.

Referring to FIG. 8, the top and bottom cover papers are bonded together along package seal profile lines 36 and 37. This seal 36 and 37 along with the bonded areas 12 and 30 shown in FIGS. 2 and 7, isolate the sheath within the covers 14 and 34 so that a sterile condition can be established and maintained on the operable portion of the sheath 26 prior to use. After bonding the covers along line 36, the entire assembly can be perforated along line 38 to form thereby an optional tab 40 which may be used for attaching the individual sheath assemblies to a suitable backing. In an alternative, perforations 38 may be located in the top cover on an extension of the top paper adjacent the open end of the cover. Following sealing along lines 36 and 37 and tab perforation along lines 38, the individual sheath assemblies may be severed from the web along the center of line 37.

FIG. 9 shows the individual assemblies as severed from the web of FIG. 8, accumulated in a stack and fastened by a staple or similar means to a suitable dispensing backing 42. As noted above, location of a tab on the open end of the package can alternatively be provided, with a similar attachment to a dispensor backing. Thermometer 44 as shown is inserted in the uppermost sheath.

FIG. 10A, B and C shows the product of FIG. 9 as it is to be used. After insertion of the thermometer 44 into the uppermost sheath through the opening provided by the notch 20 in the front paper, the sheath assembly is removed from the dispensing backing 42 by tearing along the packaging-tab perforation 38. The opening portion of the cover between perforation 38 and weakened area or scored means 18 is subsequently folded back as shown in FIG. 10B, causing the paper to break at the weakened area 18 adjacent the closed end of the enclosed sheath. This opening portion may then be broken open and the opening portion along with the remaining portion between 18 and the seal area 12 of the cover is forced to slide along the length of the sheath, in an accordian fashion to form a folded tab adjacent to the mouth 20 of the sheath as shown in FIG. 10C, with the operable portion of the sheath exposed for use. Alternatively, the weakened line 18 can be eliminated and seal line 36 can then substitute as the weakened cover area to allow exposure of the operable portion of the sheath. This method of construction eliminates the paper tab (opening portion) defined by weakened area 18 but otherwise does not alter the invention or method of use as previously described. After completion of the temperature taking procedure, the top edge of the cover is used to reextend the cover around the soiled sheath thereby reducing the possibility of contact between the sheath and the user.

As described above, this particular method of assembling sterile tear tab thermometer sheaths has several unique features. The sheath assembly has one solid cover and one cover notched at the open end to allow access to the inside of the sheath. It has a weakened cover portion near the closed end to facilitate access to the operable portion of the sheath. It has a replaceable outer cover which may be used to expose the sheath and to subsequently recover it. Thus, by constructing a sterile thermometer sheath in accordance with my above described invention, the advantages of prior art sheath are retained and the disadvantages of such prior art sheaths are minimized or eliminated.

The thermometers may be passed into the sheath through slot 70 in FIG. 10D.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved sterile thermometer sheath of the type having a preformed sheath between an upper and a bottom cover layer surrounding an upper and bottom sterile plastic layer which are sealed together to form a sterilizable cover and thermometer sheath, the thermometer sheath having a mouth and a useable portion, wherein the improvement comprises:

said cover fixed to at least a portion of said sheath to prevent separation;

said cover including a weakening means adjacent the closed end of said sheath such that said cover may be withdrawn from adjacent said useable portion of said sheath;

said cover layers connected together to maintain their hollow elongated integrity about said sheath as they are moved along said sheath; and said cover designed to be moved along the length of said useable portion of said sheath toward said mouth to expose said useable portion of said sheath for use.

2. An improved sterile thermometer sheath as set forth in claim 1, wherein;

said cover is a reuseable cover designed to be moved back along the length of said useable portion of said sheath to recover the sheath before disposal.

3. An improved sterile thermometer sheath as set forth in claim 2 wherein;

said cover providing a smaller visably surface area in its useable position when exposing said sheath and maintaining said integrity.

4. An improved sterile thermometer as set forth in claim 3, wherein;

said sheath includes said mouth providing a thermometer opening in one layer and a mating opening through one of the cover layers to allow access to the interior of said sheath.

5. An improved sterile thermometer sheath as set forth in claim 1, wherein;

said cover is designed to move from a covering position over said sheath to expose said useable portion of said sheath in accordian fashion.

* * * * *